April 30, 1963 NIRO AKAHANE 3,087,395
COUPLED CAMERA AND EXPOSURE METER
Filed March 10, 1960 2 Sheets-Sheet 1
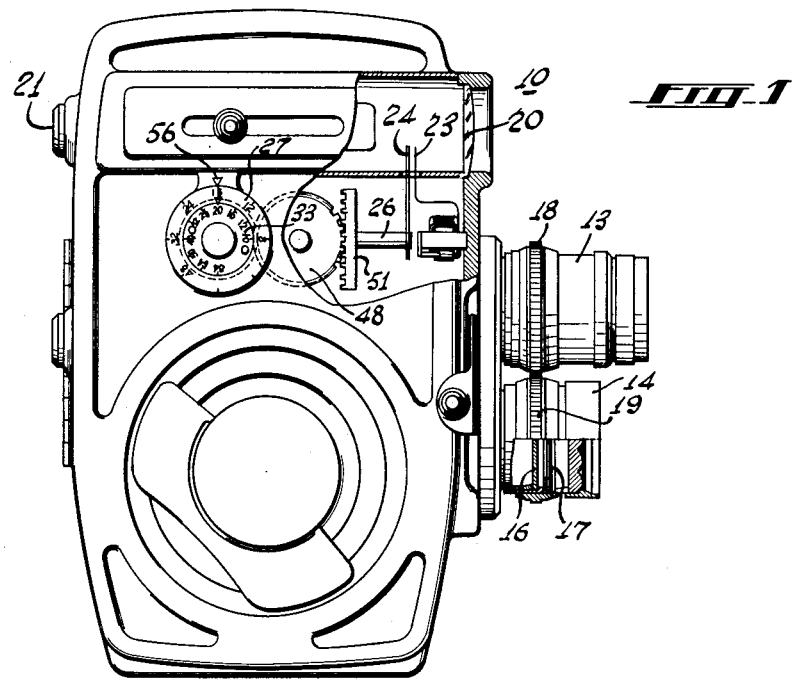
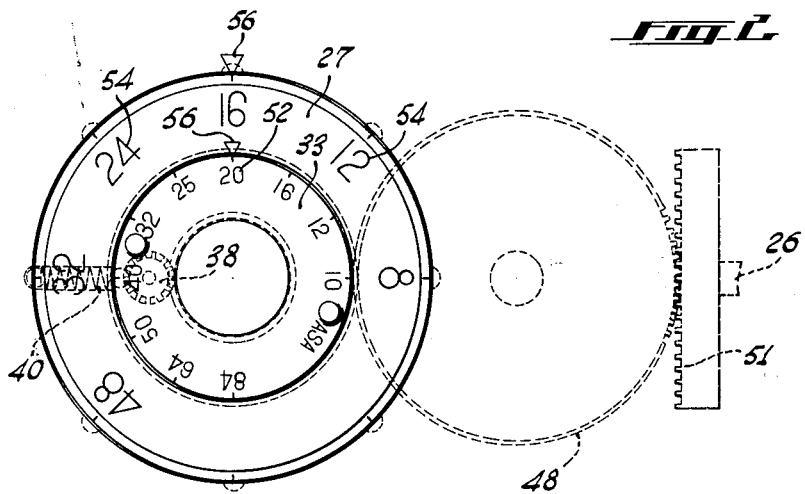
INVENTOR.
NIRO AKAHANE
BY Stanley Wolder
ATTORNEY April 30, 1963 NIRO AKAHANE 3,087,395
COUPLED CAMERA AND EXPOSURE METER
Filed March 10, 1960 2 Sheets-Sheet 2
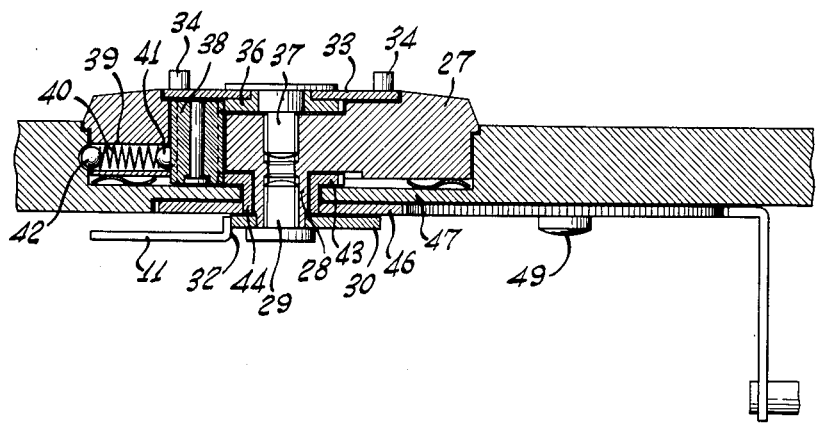
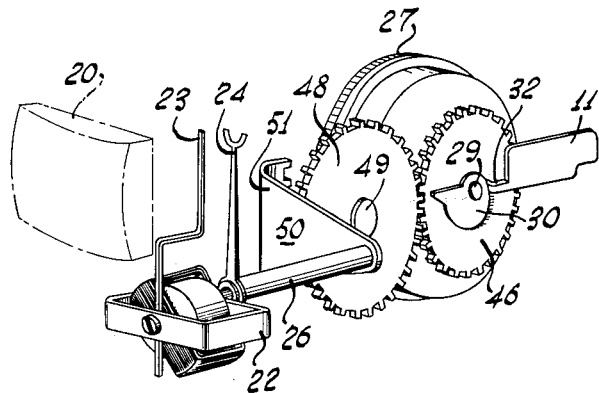
INVENTOR.
NIRO AKAHANE
BY Stanley Wolder
ATTORNEY United States Patent Office 3,087,395
Patented Apr. 30, 1963

3,087,395
COUPLED CAMERA AND EXPOSURE METER
Niro Akahane, Simosuwamachi, Suwa-gun, Nagano-ken, Japan, assignor to Yashica Co., Ltd. (Japanese name Kabushiki Kaisha Yashica), Tokyo, Japan, a corporation of Japan
Filed Mar. 10, 1960, Ser. No. 14,150
Claims priority, application Japan Mar. 20, 1959
10 Claims. (Cl. 95—10)

The present invention relates generally to improvements in motion picture cameras and relates more particularly to an improved motion picture camera provided with a coupled photoelectric exposure meter.

In order to achieve optimum exposure of the film in the operation of a motion picture camera the intensity of the light reaching the film must be accurately controlled and properly correlated with the film speed rating. This calls for the accurate adjustment of the lens aperture and the shutter speed in view of the available light reflected to the camera and the speed rating of the film. The conventional motion picture cameras for amateur use vary in this connection from the automatic light regulated camera, wherein the lens diaphgram is automatically adjusted by a photoelectric cell energized meter to control the light incident on the film, to the camera wherein all the adjustments are manually made following the necessary calculations involving the various parameters, that is, the light intensity of the subject, the film speed rating, the shutter speed and the lens diaphragm opening. The present invention relates to motion picture cameras of the non-automatic type wherein a camera mounted photoelectric exposure meter is coupled to the various camera adjusting elements so that the camera automatically corelates the variables to indicate the condition of the camera with respect to the light conditions. While cameras employing coupled photoelectric exposure meters are common and many types have been suggested they are generally characterized by the limitation of the correlated variables, by their complexity and by their frequent malfunctioning. While the camera employing the coupled photoelectric exposure meter is not as automatic as the diaphragm regulated type of camera it is usually simpler and less expensive and possesses numerous other advantages.

It is therefore a principal object of the present invention to provide an improved camera.

Another object of the present invention is to provide an improved motion picture camera provided with a coupled photoelectric exposure meter.

Still another object of the present invention is to provide an improved motion picture camera provided with a coupled photoelectric exposure meter which automatically correlates the film speed rating, the shutter speed, the lens opening and the light incident upon the camera.

A further object of the present invention it to provide a motion picture camera of the above nature characterized by its simplicity, ruggedness, versatility, dependability and low cost.

The above and other objects of the present invention will become apparent from a reading of the following description taken in conjunction with the accompanying drawings, wherein:

FIGURE 1 is a side elevational view of a camera embodying the present invention, shown partially broken away and partilly in section;

FIGURE 2 is an enlarged detailed side elevational view of the camera exposure meter index element adjusting mechanism;

FIGURE 3 is a longitudinal cross sectional view thereof; and

FIGURE 4 is a front perspective view of the index member adjusting mechanism and the exposure ammeter, the camera viewer objective lens being shown in broken line.

In a sense the present invention contemplates the provision of an improved camera of the character described comprising a first manually adjustable member, a second manually adjustable member, a photoelectric exposure meter including an indicator element and coupled to said first and second manually adjustable members and movable in response to the independent movement thereof.

According to a preferred form of the present invention the first adjustable member is a knob which controls the camera shutter speed and the second adjustable member is a disc or ring coaxially and rotatably mounted on the first member, film speed and shutter speed indicia and suitable indicators being carried by the two members. A first gear is affixed to the second member and engages a planetary second gear passing through an axially offset bore in the first member and engaging a third gear rotatably axially carried by the first member. A fourth gear is secured to the third gear and is coupled by a gear and rack train to the index element. A pair of spring actuated detents releasably restrain the movement of said first member and the axial rotation of said planetary gear. Thus, upon rotation of the first member, the second member is rotated therewith by reason of the locked second gear which also causes the third gear to rotate with the first member and thereby correspondingly adjust the meter index element. Moreover, upon rotation of the second member relative to the stationary first member the third gear is rotated by way of the first and second gears, likewise to correspondingly adjust the index element. The sensitivity of the exposure meter is automatically regulated by coupling the camera lens diaphragm to a shade movable across the exposure meter photoelectric cell.

Referring now to the drawings which illustrate a preferred embodiment of the present invention the reference numeral 10 generally designates a motion picture camera incorporating the improved arrangement and including a variable speed shutter mechanism of conventional construction provided with the usual slidable speed control element 11. The body or casing 12 of the camera has mounted on its front face a first barrel 13 housing the camera main lens system and an adjustable aperture diaphragm and a second barrel 14 housing a forwardly directed photoelectric cell 16 and an anterior adjustable diaphragm 17. The barrels 13 and 14 carry coupled rotatable diaphragm control rings 18 and 19 respectively so that the lens aperture and the photocell aperture are concurrently dependently adjustable in a similar sense.

Located in the upper portion of the camera body 12 is a tubular variable field type viewer including a forward objective lens 20 and a read eye piece 21. Mounted directly below the forward section of the viewer is a sensitive microammeter 22 which is connected in the usual manner to the photoelectric cell 16 and includes a moving coil carried indicator element or needle 23, the upper free end of which moves in a path lying across the lower forward section of the viewer so as to be clearly visible through the eye piece 21. An index element 24 is mounted on a longitudinally extending shaft 26 and is provided with a forked upper end movable in a path parallel and immediately posterior to the path of the needle 23 and also clearly visible through the eye piece 21.

In order to permit the adjustment of the camera shutter speed by way of the slidable governor control element 11 there is provided a circular knob 27 which partially nests in a cylindrical well formed in the outer face of the camera body side wall and includes an inwardly directed shank 28 passing through an opening in the body wall. Secured to the inner end of the shank 28 by means of a screw 29 is a cam 30 which rotates with the knob 27 and engages the cam follower defining arm 32 projecting from the speed control element 11.

Rotatably nesting in a shallow coaxial circular well formed in the outer face of the knob 27 is an annular shaped second control member 33 provided with a pair of diametrically opposite upstanding finger pieces 34. A first gear 36 coaxially underlies the annulus 33 and is provided with a hub registering with the opening in the annulus 33 and is affixed thereto by a headed screw 37 which engages a tapped coaxial bore in the knob 27 to permit the rotation of the annulus 33 and gear 36 relative to the knob 27. An elongated planetary second gear 38 rotatably registers with a longitudinal axially offset bore formed in the knob 27 and engages the first gear 36. Communicating with the axial offset bore is a radial bore 39 extending to the periphery of the knob 27 and housing a helical compression spring 40 which engages and urges outwardly a pair of inner and outer ball detents 41 and 42 respectively. A plurality of circumferentially spaced recesses are formed in the wall of the knob receiving recess and are each adapted to releasably engage the detent 42, and a plurality of circumferentially spaced recesses are likewise formed in the second gear 38 and are adapted to each releasably engage the detent 41. Thus upon rotation of the knob 27 the gear 38 is locked against rotation by the detent 41 as is the annulus 33 and upon rotation of the annulus 33 and the gear 38 the knob 27 is locked against rotation by the detent 42.

A third gear 43 engaging the second gear 38 abuts the underface of and is coaxial with the knob 27. The gear 43 is provided with an elongated hub 44 rotatably engaging the knob shank 28 and has affixed adjacent its inner end a fourth gear 46. The gear 46 is spaced from the gear 43 by the intervening camera body wall section 47. A fifth gear 48 is rotatably mounted on the camera body wall by a screw pin 49 and engages the gear 46.

Secured to the rear end of the index element carrying shaft 26 is a radially extending quadrant arm 50 which is provided along its periphery with a rearwardly directed arcuate rack 51 engaging the gear 48. Thus rotation of the gear 46 swings the index needle 24 by way of the gear 43, rack 51, and shaft 26.

Printed or otherwise impressed along the outer border of the annulus 33 are a plurality of spaced suitable indicia 52, corresponding to film speed ratings and an indicator 53 is carried by the knob 27 and registers with the path of the indicia 52. In addition, shutter speed designating indicia 54 are impressed along the outer border of the knob 27 and an indicator 56 mounted on the camera wall registers with the path of the indicia 54.

In employing the improved camera described above, the operator rotates the annulus 33 by means of the finger pieces 34 until the indicia 52 corresponding to the speed rating of the film being used registers with the indicator 53. The rotation of the annulus 33 rotates the gear 36 which in turn rotates the gear 43 by way of the planetary gear 38. The gear 43 causes the gear 46 to rotate thereby actuating the rack 51 by way of the gear 48 to adjust the index element 24 in a direction towards the high end of the meter scale with decreasing film speed ratings and vice versa. It should be noted that the knob 27 is locked against rotation, as aforesaid, upon the rotation of the annulus 33. The knob 27 is then rotated to bring the desired shutter speed indicia 54 into registry with the indicator 56, the camera shutter speed being thereby adjusted by the corresponding movement of the cam 30 which acts upon the speed governor element 11. The gear 38 being locked against axial rotation upon rotation of the knob 27 and moving with the knob 27, rotates the gear 43 therewith which adjusts the position of the index needle 24 by way of the gears 46 and 48, rack 51, and shaft 26. It should be noted that an increased shutter speed is accompanied by a movement of the index needle 24 toward the high end of the meter scale and vice versa. The above adjustment steps of the annulus 33 and knob 27, of course, may be reversed. The operator then observes through the viewer the subject to be photographed as well as the indicator and index needles 23 and 24 and adjusts the lens aperture by means of the ring 18. As the lens diaphragm is closed the coupled photocell diaphragm is closed reducing the exposure meter sensitivity and swinging the indicator needle toward the low end of the scale and, as the diaphragms are opened increasing the meter sensitivity, the indicator needle swings toward the high end of the scale. When the indicator and index needles 23 and 24 are in visually aligned registry the camera is suitably adjusted to the light conditions and the shutter may be actuated. It is apparent from the above that the accurate adjustment of the camera to the film and shutter speeds and to the prevailing light conditions is a very simple operation leaving very little room for error.

While there has been described and illustrated a preferred embodiment of the present invention it is obvious that numerous alterations, additions and omissions may be made without departing from the spirit thereof.

What is claimed is:

1. A camera comprising a rotatable shutter speed control first member, a film speed setting second member coaxially rotatable relative to said control member, a photoelectric exposure meter including an indicator element movable in response to the light incident thereon, a movable index element visually registering with said indicator element, a first gear coaxially affixed to said second member, a second gear engaging said first gear and axially offset relative thereto and rotatably carried by said first member and movable therewith, and a third gear rotatably and coaxially mounted relative to said first member and engaging said second gear and coupled to said index element.

2. A camera in accordance with claim 1 wherein said second member is defined by a circular member mounted on said first member, said first member having shutter speed indicia associated therewith and said second member having film speed indicia associated therewith.

3. An improved camera in accordance with claim 1 including a spring actuated detent element releasably restraining the rotation of said second gear about its axis.

4. An improved camera in accordance with claim 1 including a spring actuated detent element releasably restraining the rotation of said first member upon rotation of said second member.

5. An improved camera in accordance with claim 1 including a fourth gear affixed to and rotatable with said third gear, a fifth gear engaging said fourth gear, a shaft, said index element being fixedly mounted to and projecting radially from said shaft and a cylindrical rack mounted fixedly to and coaxial with said shaft and engaging said fifth gear.

6. A camera in accordance with claim 1 wherein said first member has formed therein a bore parallel and offset relative to the axis of said first member, said second gear rotatably registering with said bore.

7. A camera in accordance with claim 1 including a viewing lens system, said indicator element and index element being located within said viewing lens system.

8. An improved camera as described in claim 1 said first member having formed therein a passageway extending from said second gear to the perimeter of said first member, spring detent means located in said passageway and bearing at one end against said second gear and at the other end against a portion of said camera which is fixed relative to said first member.

9. A camera as described in claim 8, said detent means including a ball at each end thereof.

10. A camera as described in claim 1, said camera including a taking lens and a film plane, first meter diaphragm means positioned upon said camera to control the amount of light incident upon said exposure meter, second diaphragm means mounted to said camera and positioned to control the amount of light incident upon said film plane through said taking lens, and means coupling said first and second diaphragm means.

References Cited in the file of this patent

UNITED STATES PATENTS

| | | |
|---|---|---|
| 2,902,968 | Barthruff et al. | Sept. 8, 1959 |
| 2,940,369 | Kobayashi | June 14, 1960 |
| 2,949,069 | Gebele | Aug. 16, 1960 |
| 2,955,519 | Sommer | Oct. 11, 1960 |
| 2,996,965 | La Rue et al. | Aug. 22, 1961 |
| 3,004,480 | Sauer et al. | Oct. 17, 1961 |
| 3,028,784 | Leitz et al. | Apr. 10, 1962 |

OTHER REFERENCES

American Photography, August 1946, pages 8–11 cited.